United States Patent [19]

van der Lely

[11] Patent Number: 4,671,050
[45] Date of Patent: Jun. 9, 1987

[54] MOWING MACHINE

[76] Inventor: Cornelis van der Lely, 7, Brüschenrain, Zug, Switzerland

[21] Appl. No.: 712,115

[22] Filed: Mar. 15, 1985

[30] Foreign Application Priority Data

Mar. 15, 1984 [NL] Netherlands ............... 8400818

[51] Int. Cl.⁴ ............... A01D 82/00; A01D 55/18
[52] U.S. Cl. .................... 56/16.4; 56/192; 56/13.6; 56/11.1
[58] Field of Search ............ 56/6, 13.6, 11.1, DIG. 1, 56/16.4, 192

[56] References Cited

U.S. PATENT DOCUMENTS

| | | | |
|---|---|---|---|
| 1,842,633 | 6/1932 | Sparks | 56/11.1 |
| 2,134,115 | 10/1938 | Flammang | 56/13.6 |
| 2,974,469 | 3/1961 | Smith et al. | 56/13.6 |
| 3,028,919 | 4/1962 | Smith et al. | 56/13.6 |
| 4,392,339 | 7/1983 | Berlivet et al. | 56/13.6 |

FOREIGN PATENT DOCUMENTS

| | | | |
|---|---|---|---|
| 0065500 | 11/1982 | European Pat. Off. | |
| 2447424 | 4/1976 | Fed. Rep. of Germany | 56/13.6 |
| 2647739 | 5/1977 | Fed. Rep. of Germany | |
| 2816144 | 10/1979 | Fed. Rep. of Germany | 56/13.6 |
| 8304469 | 6/1983 | Fed. Rep. of Germany | |
| 8304470 | 6/1983 | Fed. Rep. of Germany | |
| 1386256 | 2/1966 | France | |
| 8002640 | 8/1980 | Netherlands | 56/11.1 |
| 8300797 | 3/1983 | PCT Int'l Appl. | 56/13.6 |
| 598743 | 5/1977 | Switzerland | |
| 1216716 | 12/1970 | United Kingdom | 56/11.1 |

Primary Examiner—Gene Mancene
Assistant Examiner—John G. Weiss
Attorney, Agent, or Firm—Penrose Lucas Albright

[57] ABSTRACT

A mowing machine comprises cutting members which are rotatable about upwardly extending axes and drivable via a change-speed mechanism which enables their speed of rotation to be adjusted, for example to suit the characteristics of the crop being mown. The machine also has crushing member driven via a mechanism having replaceable gears for adjusting speed, said crushing member mounted behind the cutting members to rotate about a horizontal axis and having an adjustable head.

14 Claims, 2 Drawing Figures

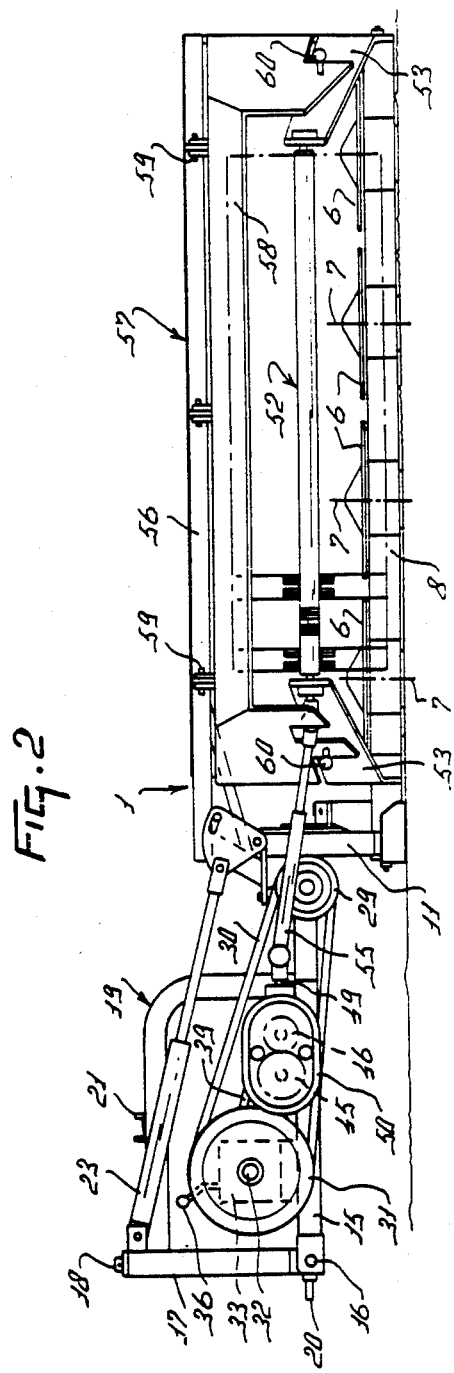

MOWING MACHINE

FIELD OF THE INVENTION

This invention relates to a mowing machine comprising a plurality of cutting members which are drivable by transmission means provided on the machine.

BACKGROUND OF THE INVENTION

One object underlying the present invention is to improve a mowing machine of this kind so that a mowing effect closer to the optimum can be obtained under different conditions.

SUMMARY OF THE INVENTION

According to the present invention, this can be achieved in that the transmission means comprises a control mechanism which is operable to adjust the transmission ratio of the transmission means, whereby the cutting members are optionally drivable at either one of at least two different speeds for their mowing function. Thus the speed of rotation of the cutting members can be adapted to the kind of crop to be cut by the mowing machine. Moreover, the speed of rotation of the cutting members can be adapted to the speed with which the mowing machine can be driven along the surface to be mown.

An advantageous embodiment can be obtained when the cutting members are rotatable about upwardly extending rotary axes. Preferably the mowing machine in accordance with the present invention is designed so that the control mechanism enables the transmission ratio of the transmission means for driving the cutting members to be raised or lowered by up to 20% above or below the mean speed of rotation of the cutting members.

A structurally advantageous embodiment is obtained when the control mechanism is mounted on a carrying arm to which a carrying beam supporting the cutting members is pivotally fastened, transmission members in the carrying beam being drivably connected by a belt transmission with the control mechanism.

According to another aspect of the present invention, there is provided a mowing machine having a crushing device comprising at least one driven crushing member, a transmission mechanism being provided for driving the crushing member, the transmission mechanism being provided with control members by means of which the driving speed of the crushing member can have optionally either of at least two different values. In this way the crushing effect can be optimized under different conditions. For example, the speed of rotation of the crushing member can be adapted to the amount of crop that can be mown per unit time by the mower.

An advantageous construction is obtained when the transmission members for the crushing member comprise a belt drive connected to an input shaft of the control mechanism for driving the cutting members.

In a preferred embodiment of a machine in accordance with the present invention, the crushing device comprises a crushing member rotatable about a horizontal shaft.

BRIEF DESCRIPTION OF THE DRAWINGS

FIG. 2 is a rear view of the mowing machine of FIG. 1 taken in the direction of the arrow II in FIG. 1.

DETAILED DESCRIPTION OF A PREFERRED EMBODIMENT

Figure 1:
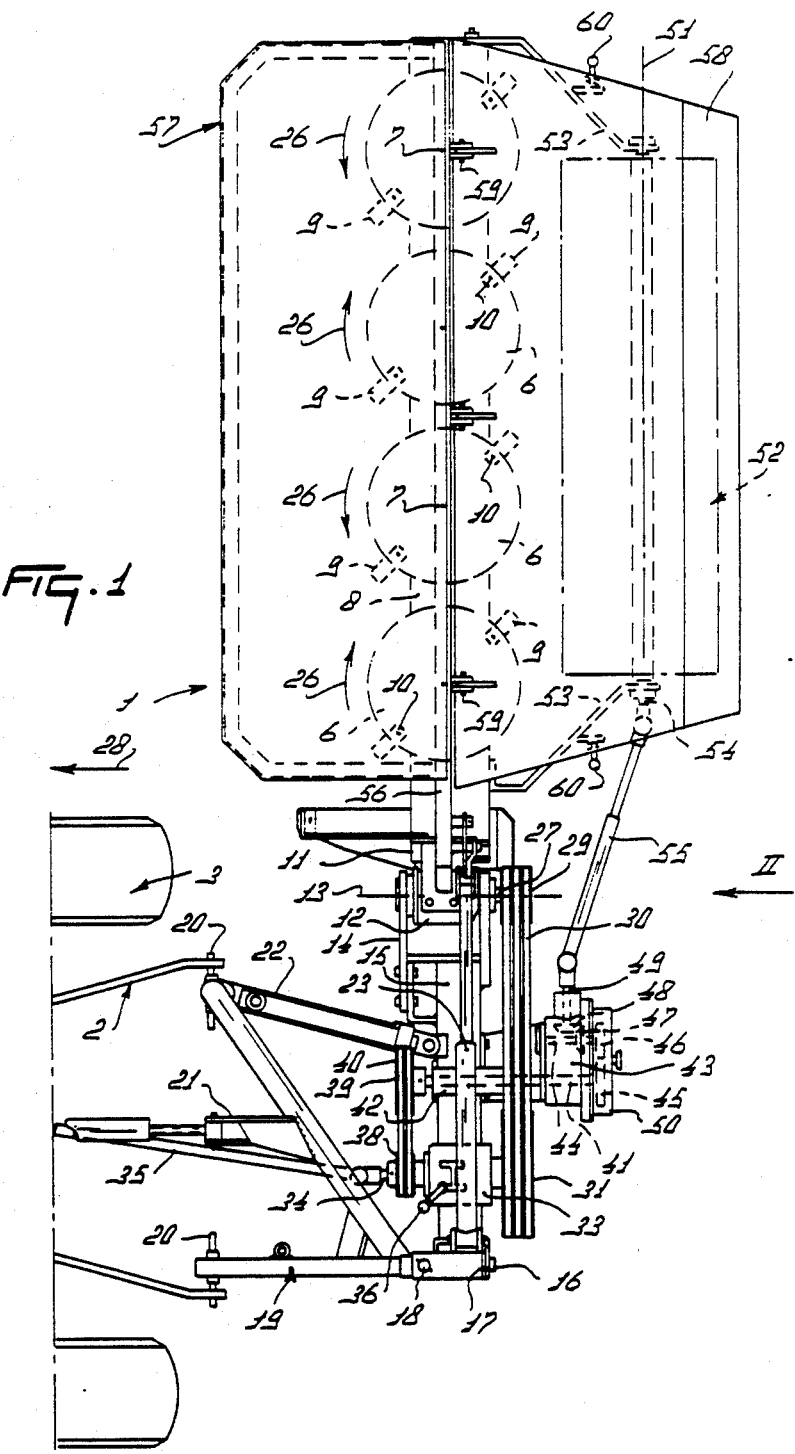
FIG. 1 is a plan view of a mowing machine (per amend A) in accordance with the invention.

The mowing machine 1 shown in FIGS. 1 and 2 is hitched to a lifting device 2 of a tractor 3.

The particular mowing machine shown in the Figures comprises four cutting members in the form of mowing discs 6 which are rotatable about upwardly extending rotary axes 7. The discs 6 are mounted on a carrying beam 8. Each mowing disc 6 has two diametrically opposite blades 9, which are rotatable with respect to the mowing disc about blade axes 10 which are substantially parallel to the axes 7. In operation, blades 9 are urged downwardly as shown by centrifugal force. In the horizontal position of the mowing discs 6, the axes 7 are vertical. The carrying beam 8, which is horizontal in the horizontal position of the machine, is connected near the end adjacent the tractor 3 to a gear box 11, which is perpendicular to the beam 8 and is rigidly connected to a gear wheel housing 12. The gear wheel housing 12 is pivotable about a pivotal axis 13, which is horizontal in the horizontal position of the machine, and is coupled with a fork 14 of a carrying arm 15. The carrying arm 15 is connected by a horizontal pivotal shaft 16 to a vertical frame beam 17. The frame beam 17 is connected by a vertical pivotal shaft 18 to a carrying trestle 19. The carrying trestle 19 is provided with fastening pins 20 for hitching the trestle, and hence the mowing machine, to the lower lifting members of the lifting device 2. The carrying trestle 19 also has coupling strips 21 for hitching the trestle to the upper lifting arm of the three-point lifting device as is illustrated in FIG. 1.

There is a shear pin mechanism 22 between the trestle 19 and the carrying arm 15 to permit rotation of the carrying arm 15 with the carrying beam 8 about the pivotal shaft 18 upon overload. A lifting mechanism 23 is provided between the vertical beam 17 and the beam 8 to control the movement of the carrying arm 15 about the shaft 16. The lifting mechanism 23 can transfer at least part of the weight of the beam 8 to the beam 17. The mechanism 23 can cooperate with springs (not shown) in order to transfer at least part of the weight of the beam 8 in a resilient manner to the beam 17.

The mowing discs 6 are coupled with transmission members accommodated in the carrying beam 8 so that the mowing discs can be rotated in the direction indicated by arrows 26, i.e. with adjacent discs rotating in opposite directions to each other.

The transmission in the carrying beam 8 is constructed so that it is adjustable to enable the cutting members to be rotated in a manner differing from that shown in FIG. 2. The transmission mechanism in the beam 8 is connected by gear wheels in the gear box 11 to bevel gear wheels (not shown in detail) in the gear wheel housing 12. One of the bevel gear wheels is connected to the gear wheels in the box 11, whereas the other bevel gear wheel is mounted on a driving shaft 27 which is journalled in the housing 12 and projects from the rear of the housing 12, with respect to the normal direction of operative travel of the mowing machine, indicated by an arrow 28. The projecting part of the shaft 27 is provided with a pulley 29. The pulley 29 is connected by belts 30 to a pulley 31 mounted on a shaft 32 which is journalled in a change-speed box 33 constituting a control mechanism. The change speed box 33 is secured to the carrying arm 15 and has a forwardly extending input shaft 34, which can be connected by an auxiliary shaft 35 to the power take-off shaft of the tractor or of a similar vehicle to which the machine is hitched. The box 33 is situated, as viewed on plan, approximately centrally behind the trestle 19. The input shaft 34 is provided with a pulley 38, which is connected by belts 39 to a pulley 40 on a shaft 41 which is journalled in a bearing 42 mounted on the carrying arm 15. The shaft 41 extends rearwardly from the carrying arm 15 into a change-wheel casing 43, constituting a transmission mechanism, which is rigidly mounted on the carrying arm 15. The change-wheel casing 43 is disposed, as viewed on plan, behind the carrying arm 15 and the belts 30. A shaft 44 supported in the change-wheel casing 43 extends parallel to the shaft 41 and replaceable wheels 45 and 46 are mounted on the shafts 41 and 44. The shaft 44 is provided with a bevel gear wheel 47, which meshes with a bevel gear wheel 48 fastened to a laterally projecting output shaft 49.

The mowing machine is equipped with a crushing or conditioning device comprising a crushing member 2 which is rotatable about a horizontal rotary axis 51. The crushing member is supported by a shaft 54 journalled in supports 53 which are fastened to the carrying beam 8. The shaft 54 of the crushing member is connected by an auxiliary shaft 55 to the output shaft 49 of the change-wheel casing 43. A supporting arm 56, disposed directly above the carrying beam 8, carries a screening hood 57 extending to a position ahead of the front of the mowing discs 6. A hood 58 extends to the rear of the supporting arm 56 to a position as viewed on plan, behind the crushing member 52. The hood 58 is movable upwardly and downwardly about pivotal pins 59 which extend parallel to the supporting arm 56 and the carrying beam 8 and can be optionally secured in any one of at least two different positions by means of a locking mechanism 60.

To put the machine into operation, it is coupled with a tractor in the manner shown in the Figures. During operation the mowing discs 6 and the crushing member 52 can be driven from the power take-off shaft of the tractor through the transmission members described above. The beam 8 extends laterally from the tractor. The mowing discs 6 are driven through the control mechanism 33 from the shaft 34, which is connected by the auxiliary shaft 35 to the power take-off shaft. The control mechanism 33 enables two different transmission ratios to be selected to drive the pulley 31 optionally at either one of at least two different speeds. Thus, because the transmission ratio between the pulley 31 and the mowing discs 6 is fixed, the mowing discs can be selectively driven at either one of at least two different speeds. Preferably, the control mechanism 33 enables at least three different transmission ratios to be selected. In the described embodiment, four different transmission ratios can be selected by means of the mechanism 33. The mechanism 33 is such that the mowing discs can be driven both more slowly and more rapidly with respect to the mean speed of the mowing discs for cutting crops in most cases. Thus, by reference to the mean speed of rotation of the mowing discs, the speed can preferably be reduced by, for example, 20% or raised by 20%.

The ability to vary the speed of rotation of the mowing discs enables their speed of rotation to be adapted to different kinds of crop. The speed of rotation can also be adapted to the travel speed of the mowing machine during operation. This adaptability of the speed of rotation ensures an optimum cutting effect. The energy required to obtain this optimum cutting effect is thus minimized.

In the illustrated embodiment, the mowing machine is equipped with the crushing device comprising the crushing member 52. The change-wheel casing 43 having the replaceable wheels 45 and 46 enables this crushing member 52 to be selectively driven at either one of at least two different speeds. An advantageous embodiment is obtained when the crushing member 52 can be driven optionally at any one of at least three speeds of rotation. Two different speeds of rotation of the crushing member can be obtained by interchanging the replaceable wheels 45 and 46. The replaceable wheels 45 and 46 can be replaced by one or more sets of other replaceable wheels so that the driving speed of the crushing member 52 about the axis 51 can have various values. Preferably the number of replaceable wheels provided is such that a selection can be made among six different speeds for the crushing member. It is advantageous to have the possibility of changing the speed of rotation of the crushing member to speeds 50% above and 50% below its mean speed. This adjustability of the speed of rotation of the crushing member enables the crushing effect to be optimized. In order to ensure the most desirable crushing effect, the crushing member 52 is preferably driven at different speeds for different kinds of crop. Even with the same kind of crop, it may be important under different conditions to be able to select the speed of rotation of the crushing member from at least two different values.

The hood 58 associated with the crushing device cooperates with the crushing member. To adjust the crushing effect, the hood can be displaced and fixed at will in any one of a plurality of positions at different distances above the crushing member.

Although in this embodiment a change-wheel casing 43 is used to change the speed of the crushing member, a different kind of transmission may be provided for this purpose. The replaceable wheels 45 and 46 can be readily interchanged or replaced by other wheels, since the cover 50 at the rear of the casing 43 is readily removable. The location of the casing 43 behind the belt transmission 29, 30, 31, as viewed on plan, ensures a satisfactory position of the auxiliary shaft 55.

Also, the control mechanism 33, provided in this embodiment with an adjusting arm 36 for selecting the desired speed of the cutting members, may be constructed differently for varying the speed of rotation of the mowing discs. If desired, both the control member 33 and the change-wheel casing 43 may comprise a transmission member capable of continuously adjusting the speed of rotation of the mowing discs and the crushing member between given values.

Although, in the illustrated embodiment, the mower is provided with a crusher, the principle of optionally adjusting the speed of rotation of the mowing discs between at least two different values can equally well be applied when the mower is not equipped with a crusher.

It is also possible to drive a crushing member at will with any one of at least two different speeds in a crushing machine or conditioner not provided with cutting members drivable at will with different speeds.

Adjustment of the hood 58 by means of the locking mechanism 60 between at least two different positions about the pivotal shaft 59 can be readily performed for controlling the influence of the crushing operation of the crushing member together with the hood. In particular the position of the hood can be selected in accordance with the speed of rotation of the crushing member.

Although in this embodiment a crushing device having a crushing member rotatable about a horizontal axis is provided on the cutting member, the principle of optionally driving a crushing member at any one of at least two different speeds can also be applied when the mowing machine is provided with one or more crushing members rotatable about upwardly extending rotary axes. The principle of varying the speed of rotation of a crushing member may also be applied when the mowing machine is provided with two or more mutually cooperating crushing members rotatable about horizontal axes.

Although various features of the mowing machine described and illustrated ion the drawings will be set forth in the following claims as inventive features, the invention is not necessarily limited to these features and may encompasses further inventive features that have been disclosed individually and in various combinations.

I claim:

1. A mowing machine comprising;
a plurality of cutting means mounted on carrier means which is adapted to be connected to and extend transversely from the three-point hitch of a tractor, said means rotating about substantially vertical axes in operation;
first transmission means adaptable to be powered from a tractor for rotating said cutting means, said first transmission means including means for rotating said cutting means selectively at different speeds; and
crushing means mounted on said carrier means behind said cutting means, said crushing means rotated by a second transmission means for rotating said crushing means selectively at different speeds whereby the variable speed of rotation of said cutting means can be varied independently of the variable speed of rotation of said crushing means.

2. A mowing machine as claimed in claim 1, in which said cutting means are rotatable about upwardly extending rotary axes.

3. A mowing machine as claimed in claim 1, in which each said cutting means is provided with at least one mowing blade which is movable about its axis under the influence of centrifugal force.

4. A mowing machine as claimed in claim 1, in which said first transmission means is adjustable to raise and lower the speed of rotation of said cutting means by about 20% above and below their mean speed of rotation.

5. A mowing machine as claimed in claim 1, in which said second transmission means for driving said crushing means is such that the speed of rotation of said crushing means can be adjusted to raise and lower the speed of rotation of said crushing means by about 50% above or below the mean speed rotation.

6. A mowing machine as claimed in claim 1, by which said second transmission means is such that said crushing means can be optionally driven at any one of at least three different speeds.

7. A mowing machine as claimed in claim 1, in which said second transmision means is a change-gear casing.

8. A mowing machine as claimed in claim 1, further comprising;
an input shaft on said first transmission means adaptable to be powered from a tractor;
said second transmission means for said crushing means including a belt drive connected to said input shaft.

9. A mowing machine as claimed in claim 8, in which said input shaft is connected by an auxilliary shaft to a power take-off shaft of the tractor or a similar vehicle to which the mowing machine is hitched.

10. A mowing machine as claimed in claim 1, in which said crushing means is rotatable about a horizontal axis.

11. A mowing machine as claimed in claim 1, further comprising a fastening trestle for hitching the mowing machine to a lifting device of a tractor or a similar vehicle.

12. A mowing machine as claimed in claim 1, characterized in that a hood is provided which cooperates with said crushing means and is movable and selectively fixable in any one of at least two different positions relative to said crushing means.

13. A mowing machine as claimed in claim 12, in which said hood is mounted on a supporting arm which is disposed above said cutting members.

14. A mowing machine as claimed in claim 12, in which said mowing hood is movable about an axis which is substantially parallel to the axis of said crushing means.

* * * * *